United States Patent
Chou et al.

(10) Patent No.: US 11,035,029 B2
(45) Date of Patent: Jun. 15, 2021

(54) MATERIAL FOR FORMING METAL MATRIX COMPOSITE AND METAL MATRIX COMPOSITE BULK

(71) Applicant: Industrial Technology Research Institute, Hsinchu (TW)

(72) Inventors: Li-Shing Chou, Tainan (TW);
Chih-Chao Yang, Tainan (TW);
Chi-San Chen, Kaohsiung (TW);
Chih-Jung Weng, Tainan (TW);
Heng-Yi Tsai, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/551,755

(22) Filed: Aug. 27, 2019

(65) Prior Publication Data
US 2020/0199721 A1    Jun. 25, 2020

Related U.S. Application Data

(63) Continuation-in-part of application No. 16/228,771, filed on Dec. 21, 2018.

(30) Foreign Application Priority Data

Jul. 19, 2019 (TW) ................. 108125543

(51) Int. Cl.
| | | |
|---|---|---|
| C22C 45/00 | (2006.01) | |
| C22C 1/04 | (2006.01) | |
| C22C 38/22 | (2006.01) | |
| C22C 38/02 | (2006.01) | |
| C22C 38/00 | (2006.01) | |

(Continued)

(52) U.S. Cl.
CPC .......... *C22C 45/008* (2013.01); *B23K 26/342* (2015.10); *B33Y 70/00* (2014.12); *C22C 1/0416* (2013.01); *C22C 38/002* (2013.01); *C22C 38/02* (2013.01); *C22C 38/22* (2013.01);
(Continued)

(58) Field of Classification Search
CPC ... C22C 45/008; C22C 1/0416; C22C 38/002; C22C 45/02
See application file for complete search history.

(56) References Cited

U.S. PATENT DOCUMENTS 7,052,561 B2 * 5/2006 Lu .......................... C22C 45/02
148/403
2014/0065316 A1   3/2014 Cheney et al.

FOREIGN PATENT DOCUMENTS

| CN | 101492794 | 7/2009 |
| CN | 101899663 | 12/2010 |
| CN | 102859024 | 1/2013 |

OTHER PUBLICATIONS

"Office Action of Taiwan Counterpart Application", dated Sep. 26, 2020, p. 1-p. 3.

* cited by examiner

Primary Examiner — Nicholas A Wang
Assistant Examiner — Jiangtian Xu
(74) Attorney, Agent, or Firm — JCIPRNET

(57) ABSTRACT

A metal matrix composite material includes 60-90 wt. % of aluminum alloy powders and 10-40 wt. % Fe-based amorphous alloy powders. The aluminum alloy powders are used as the matrix of the metal matrix composite material, and the Fe-based amorphous alloy powders include $Fe_aCr_bMo_cSi_dB_eY_f$, wherein 48 at. %≤a≤50 at. %, 21 at. %≤b≤23 at. %, 18 at. %≤c≤20 at. %, 3 at. %≤D≤5 at. %, 2 at. %≤c≤4 at. %, and 2 at. %≤f≤4 at. %.

6 Claims, 2 Drawing Sheets

(51) Int. Cl.
 *B23K 26/342* (2014.01)
 *B33Y 70/00* (2020.01)
 *B22F 9/08* (2006.01)
(52) U.S. Cl.
 CPC ....... *B22F 9/082* (2013.01); *B22F 2009/0836* (2013.01); *B22F 2304/10* (2013.01); *C22C 2200/02* (2013.01)

MATERIAL FOR FORMING METAL MATRIX COMPOSITE AND METAL MATRIX COMPOSITE BULK

CROSS-REFERENCE TO RELATED APPLICATION

This application is a continuation-in-part of and claims the priority benefit of U.S. application Ser. No. 16/228,771, filed on Dec. 21, 2018. This application also claims the priority benefit of Taiwan application Ser. No. 108125543, filed on Jul. 19, 2019. The entirety of each of the above-mentioned patent applications is hereby incorporated by reference herein and made a part of this specification.

TECHNICAL FIELD

The present disclosure relates to a metal matrix composite material and a metal matrix composite bulk.

BACKGROUND

Aluminum matrix composites (AMCs) are made by adding reinforcing particles to aluminum alloy, in which filler particles with high mechanical properties are embedded into lighter aluminum alloy. An aluminum matrix composite material at least has the properties such as light weight, high strength, high rigidity, high thermal conductivity, low deformation rate, easy die-casting into complex shapes, high process efficiency and low price.

However, the preparation of a composite material is often a combination or derivation of a variety of processes, and the proportion of components manufactured by conventional casting techniques is continuously decreased. Therefore, traditional industries are bound to face technological innovation.

For example, a conventional metal matrix composite material usually uses ceramic or oxide particles as a filler, but these inorganic particles are very different from the metal in terms of properties such as surface energy, thermal expansion coefficient, etc. Accordingly, poor interface bonding between the inorganic particles and the metal matrix occurs, and the mechanical properties of such composite material are reduced. At present, the conventional ceramic particles are uniformly mixed with the metal matrix, and the filler must be surface-treated first before mixing. For example, the ceramic particles are plated with a thin metal layer to increase the interface wettability with the metal matrix and reduce the agglomeration phenomenon. Therefore, the process complexity is increased. In addition, the traditional casting method is also difficult to make the metal matrix composite material into a complex 3-D structure.

SUMMARY

The present disclosure provides a metal matrix composite material which can solve the problem of poor interface bonding between the metal matrix and the filler in the composite material.

The present disclosure further provides a metal matrix composite bulk with high yield strength, high compressive strength and complex structure.

The metal matrix composite material of the present disclosure includes about 60-90 wt. % of aluminum alloy powders and about 10-40 wt. % of Fe-based amorphous alloy powders. The Fe-based amorphous alloy powders include $Fe_aCr_bMo_cSi_dB_eY_f$, wherein 48 at. %≤a≤50 at. %, 23 at. %≤b≤23 at. %, 18 at. %≤c≤20 at. %, 3 at. %≤d≤5 at. %, 2 at. %≤e≤4 at. % and 2 at. %≤f≤4 at. %.

The metal matrix composite bulk of the present disclosure is fabricated by using the above metal matrix composite material, and it has a yield strength of about 70-125 MPa.

Based on the above, the present disclosure can solve the problem of poor interface bonding between the metal matrix and the filler in the metal matrix composite material by adding specific Fe-based amorphous alloy powders, and can produce a metal matrix composite bulk with high yield strength, high compressive strength and complex structure by means of a laser additive manufacturing method.

Various exemplary embodiments accompanied with figures are described in detail below to further describe the disclosure in details.

BRIEF DESCRIPTION OF THE DRAWINGS

The accompanying drawings are included to provide further understanding, and are incorporated in and a part of this specification. The drawings are exemplary embodiments and together with the description, serve to explain the principles of the disclosure.

DETAILED DESCRIPTION OF DISCLOSED JING

Figure 1:
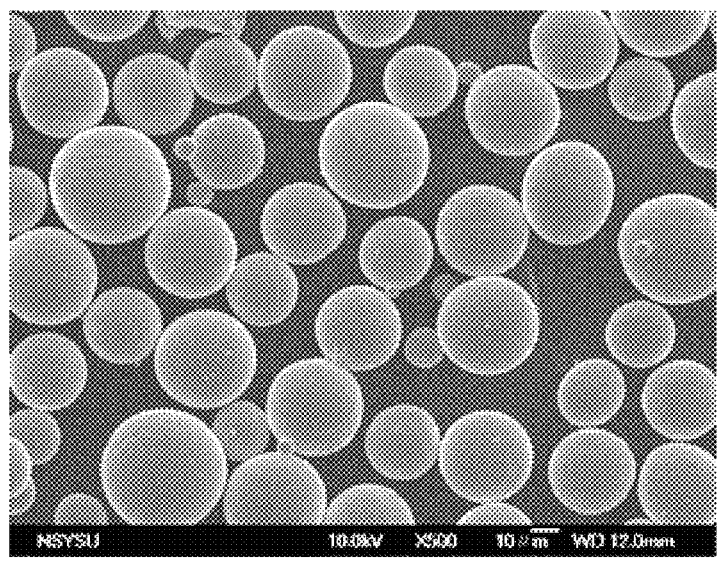
FIG. 1 is a scanning electron microscope (SEM) image of aluminum alloy powders in an experiment of the present disclosure.

The metal matrix composite material in one embodiment of the present disclosure includes about 60-90 wt. % of aluminum alloy powders and about 10-40 wt. % of Fe-based amorphous alloy powders. The Fe-based amorphous alloy powders include $Fe_aCr_bMo_cSi_dB_eY_f$, wherein 48 at. %≤a≤50 at. %, 23 at. %≤b≤23 at. %, 18 at. %≤c≤20 at. %, 3 at. %≤d≤5 at. %, 2 at. %≤e≤4 at. % and 2 at. %≤f≤4 at. %. The particle size of the above aluminum alloy powders is, for example, about 25 μm to 60 μm, and the particle size of the above Fe-based amorphous alloy powders is, for example, about 10 μm to 40 μm.

The above aluminum alloy powders are mainly composed of aluminum, and the weight percentage of aluminum is, for example, about 60 wt. % or more. The aluminum alloy powders have the properties such as low density, high elastic modulus, high strength, high corrosion resistance, and the like, and can contain, silicon, copper, magnesium, nickel, manganese and other optional trace elements in addition to aluminum.

The above Fe-based amorphous alloy powders are mainly composed of iron and contain chromium, molybdenum, silicon, boron and yttrium. In the Fe-based amorphous alloy powders, boron and silicon are metalloids that enhance the amorphous forming ability; chromium can improve oxidation resistance and corrosion resistance and release internal stress of amorphous alloy; yttrium can improve the amorphous forming ability and toughness; molybdenum can distort the crystal lattice and enhance the amorphous forming ability. In one embodiment, the Fe-based amorphous alloy powders include, for example, $Fe_{48}Cr_{21}Mo_{18}Si_3B_2Y_2$, $Fe_{49}Cr_{22}Mo_{19}Si_4B_3Y_3$ or $Fe_{50}Cr_{23}Mo_{20}Si_14B_4Y_4$.

The metal matrix composite bulk in another embodiment of the present disclosure is fabricated by using the metal matrix composite material of the above embodiment, and is produced, for example, by a laser additive manufacturing method. The metal matrix composite bulk has a yield strength of about 70-125 MPa. In addition, the metal matrix composite bulk has a compressive strength of about 160-250 MPa, for example.

Several experiments are listed below to verify the efficacy of the present disclosure, but the scope of the present disclosure is not limited to the following experiments.

<Preparation of Aluminum Alloy Powders>

First, aluminum alloy powders were prepared by gas atomization as detailed below.

5,000 g to 10,000 g of aluminum alloy were fed and placed in an induction melting graphite crucible of a gas atomizing device. The gas atomization process was carried out under the conditions of a pressure of $2\times10^{-4}$ torr to $3\times10^{-4}$ torr and a temperature of 700° C. to 800° C. to produce alloy powders, wherein the atomizing inert gas pressure was 16 bar to 18 bar, and the gas flow rate was 2 m³/min to 3 m³/min.

After the powders were cooled and collected, the powders were sieved. Next, the powders were subjected to a heat treatment using an air atmosphere heating furnace at a temperature of 300° C. to 400° C. for a period of 1 hour to 3 hours.

The gas atomized powders after the sieving and the heat treatment was observed by microscopic image of a SEM to obtain FIG. 1. In addition, a laser particle size analyzer was used for particle size analysis of the aluminum alloy powders, and a median particle size ($D_{50}$) of the aluminum alloy powders was about 25 μm to 60 μm.

This aluminum alloy powders were used in all of the following experiments.

Preparation Example 1

Fe-based amorphous alloy powders $Fe_{48}Cr_{21}Mo_{18}Si_3B_2Y_2$ were prepared by gas atomization as detailed below.

46 wt. % of iron, 19 wt. % of chromium, 29.6 wt. % of molybdenum, 2 wt. % of silicon, 0.4 wt. % of boron and 3 wt. % of yttrium were smelted and refined in a high temperature melting furnace, and cast into an ingot. Next, 5,000 g to 10,000 g of the refined iron-based amorphous alloy were fed and placed in an induction melting graphite crucible of a gas atomizing device. The gas atomization process was carried out under the conditions of a pressure of $2\times10^{-4}$ torr to $3\times10^{-4}$ torr and a temperature of 1,200° C. to 1,300° C. to produce amorphous alloy powders, wherein the atomizing inert gas pressure was 24 bar to 26 bar, and the gas flow rate was 2 m³/min to 3 m³/min.

After the powders were cooled and collected, the powders were sieved. Next, the powders were subjected to a heat treatment using an air atmosphere heating furnace at a temperature of 200° C. to 300° C. for a period of 1 hour to 3 hours.

Figure 2:
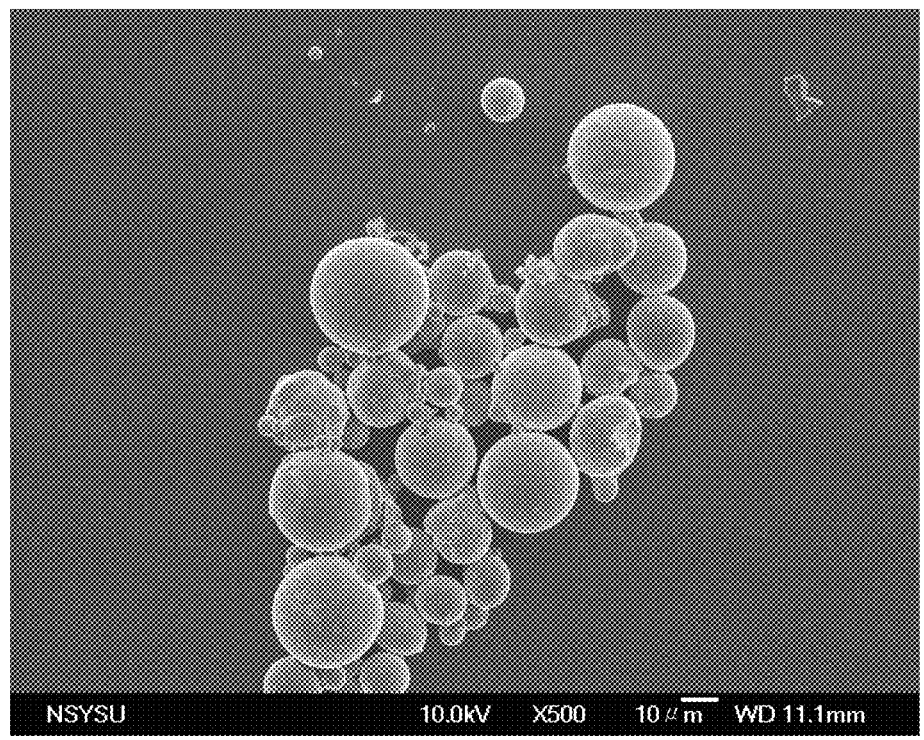
FIG. 2 is a SEM image of Fe-based amorphous alloy powders of Preparation Example 1 of the present disclosure.

The gas atomized powders after the sieving and the heat treatment was observed by microscopic image of a SEM to obtain FIG. 2. Further, the particle size analysis of the powders was carried out by a laser particle size analyzer, and a median particle size ($D_{50}$) of the powders was about 20 μm to 40 μm.

Figure 3:
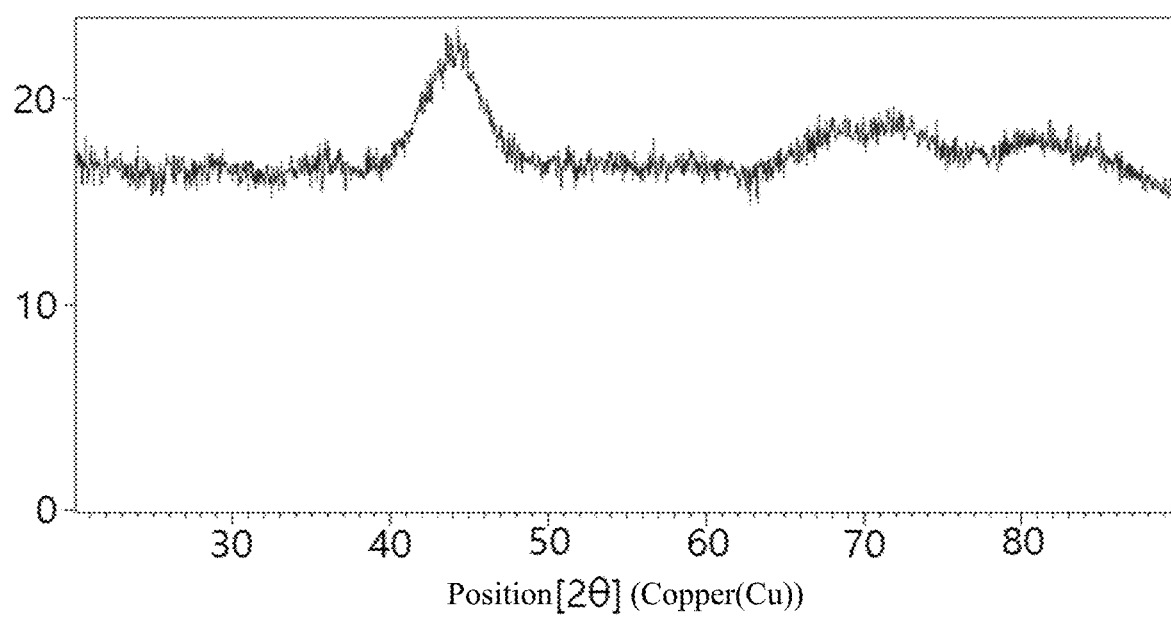
FIG. 3 is an X-ray diffraction (XRD) diagram of Fe-based amorphous alloy powders of Preparation Example 1 of the present disclosure.

In order to confirm that the obtained powders were amorphous, an X-ray diffraction (XRD) analysis was performed on the Fe-based amorphous alloy powders of Preparation Example 1 to obtain FIG. 3. There was no obvious peak in FIG. 3, so it was confirmed that the obtained powders were in an amorphous alloy state.

Preparation Example 2

Fe-based amorphous alloy powders $Fe_{49}Cr_{22}Mo_{19}Si_4B_3Y_3$ were prepared by gas atomization as detailed below.

45 wt. % of iron, 18.7 wt. % of chromium, 30 wt. % of molybdenum, 1.8 wt. % of silicon, 0.5 wt. % of boron and 4 wt. % yttrium were smelted and refined in a high temperature melting furnace, and cast into an ingot. Next, 5,000 g to 10,000 g of the refined iron-based amorphous alloy were fed and placed in an induction melting graphite crucible of a gas atomizing device. A gas atomization process was carried out under the same experimental parameters as in Preparation Example 1, to produce amorphous alloy powders.

After the powders were cooled and collected, the powders were sieved. Next, the powders were subjected to the same heat treatment as in Preparation Example 1 using an air atmosphere heating furnace. Then, a laser particle size analyzer was used for particle size analysis of the gas atomized powders after the sieving and the heat treatment, and a median particle size ($D_{50}$) of the powders was about 20 μm to 40 μm.

Preparation Example 3

Fe-based amorphous alloy powders $Fe_{50}Cr_{23}Mo_{20}Si_4B_4Y_4$ were prepared by gas atomization as detailed below.

43.5 wt. % of iron, 18.6 wt. % of chromium, 30 wt. % of molybdenum, 1.7 wt. % of silicon, 0.7 wt. % of boron and 5.5 wt. % of yttrium were smelted and refined in a high temperature melting furnace and cast into an ingot. Next, 5,000 g to 10,000 g of the refined iron-based amorphous alloy were fed and placed in an induction melting graphite crucible of a gas atomizing device. A gas atomization process was carried out under the same experimental parameters as in Preparation Example 1, to produce powers in an amorphous alloy state.

After the powders were cooled and collected, the powders were sieved. Next, the powders were subjected to the same heat treatment as in Preparation Example 1 using an air atmosphere heating furnace. Then, a laser particle size analyzer was used for particle size analysis of the gas atomized powders after the sieving and the heat treatment, and a median particle size ($D_{50}$) of the powders was about 20 μm to 40 μm.

Comparative Example 1

The prepared aluminum alloy powders were formed into a three-dimensional structure by selective laser melting (SLM). The laser beam of the above SLM had a power of substantially between 100 W and 240 W and a scan speed of substantially between 150 mm/s and 250 mm/s. The formed three-dimensional structure had a size of 1 cm×1 cm×1 cm.

Then, the yield strength and compressive strength of the three-dimensional structure were measured. The results are shown in Tables 1 to 3 and Table 5 below. The tensile strength and hardness of the three-dimensional structure were also measured. The results are also shown in Table 5 below.

Experimental Examples 1-1 to 1-3

According to the content ratio of Table 1, the aluminum alloy powders and the Fe-based amorphous alloy powders $Fe_{48}Cr_{21}Mo_{18}Si_3B_2Y_2$ of Preparation Example 1 were mixed by high-speed mechanical stirring. Table 1 only shows the content (wt. %) of the Fe-based amorphous alloy powders, and the rest is the content (wt. %) of the aluminum alloy powders.

Then, the same SLM process as in Comparative Example 1 was used to form three-dimensional structures having different contents of Fe-based amorphous alloy powders. The yield strength and compressive strength of these three-dimensional structures were measured. The results are shown in Table 1 below.

Further, the yield strength and the compressive strength of Experimental Example 1-3 are shown in Table 5 below. The tensile strength and hardness of the three-dimensional structure of Experimental Example 1-3 were measured. The results are also shown in Table 5 below.

Figure 4:
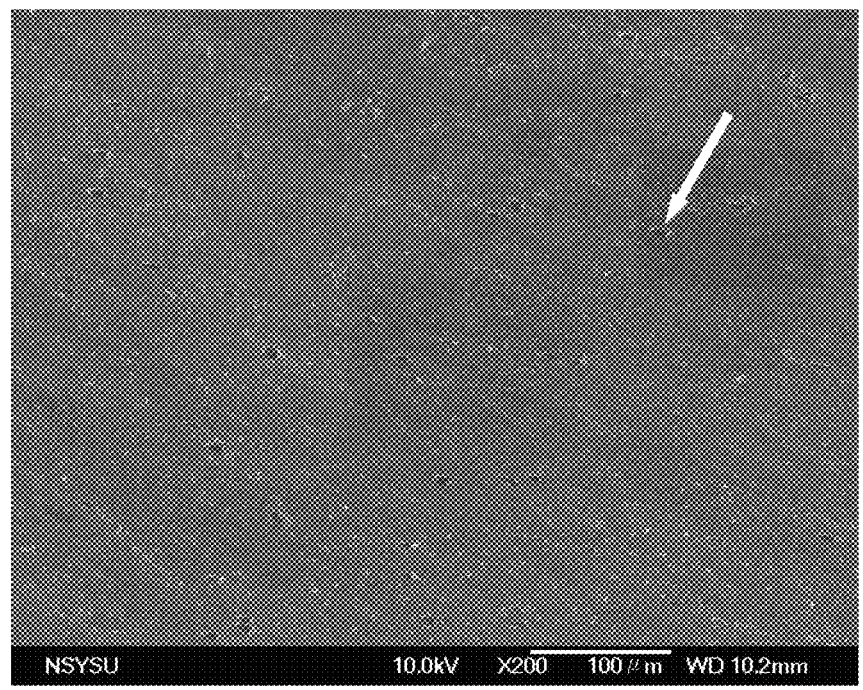
FIG. 4 is a SEM image of the metal matrix composite material of Experimental Example 1-1 of the present disclosure.

FIG. 4 is an electron microscope image of the metal matrix composite material of Experimental Example 1-1, wherein the EDS analysis is performed on the arrow marks, and the results show that iron, chromium, molybdenum, silicon, boron, and yttrium are present at the arrow marks.

Experimental Examples 2-1 to 2-3

According to the content ratio of Table 2, the aluminum alloy powders and the Fe-based amorphous alloy powders $Fe_{49}Cr_{22}Mo_{19}Si_4B_3Y_3$ of Preparation Example 2 were mixed by high-speed mechanical stirring.

Then, the same SLM process as in Comparative Example 1 was used to form three-dimensional structures having different contents of Fe-based amorphous alloy powders. The yield strength and compressive strength of these three-dimensional structures were measured. The results are shown in Table 2.

Further, the yield strength and the compressive strength of Experimental Example 2-3 are shown in Tables 4 and 5 below. The tensile strength and hardness of the three-dimensional structure of Experimental Example 2-3 were measured. The results are shown in Table 5 below.

Experimental Examples 3-1 to 3-3

According to the content ratio of Table 3, the aluminum alloy powders and the Fe-based amorphous alloy powders $Fe_{50}Cr_{23}Mo_{20}Si_4B_4Y_4$ of Preparation Example 3 were mixed by high-speed mechanical stirring.

Then, the same SLM process as in Comparative Example 1 was used to form three-dimensional structures having different contents of the Fe-based amorphous alloy powders. The yield strength and compressive strength of these three-dimensional structures were measured. The results are shown in Table 3 below.

Further, the yield strength and compressive strength of Experimental Example 3-3 are shown in Table 5 below. The tensile strength and hardness of the three-dimensional structure of Experimental Example 3-3 were measured. The results are also shown in Table 5 below.

TABLE 1

|  | Comparative Example 1 | Experimental Example 1-1 | Experimental Example 1-2 | Experimental Example 1-3 |
|---|---|---|---|---|
| Content of Fe-based amorphous alloy powders in Preparation Example 1 (wt. %) | 0 | 10 | 20 | 40 |
| Yield strength (MPa) | 45 | 62 | 76 | 116 |
| Compressive strength (MPa) | 132 | 143 | 170 | 238 |

TABLE 2

|  | Comparative Example 1 | Experimental Example 2-1 | Experimental Example 2-2 | Experimental Example 2-3 |
|---|---|---|---|---|
| Content of Fe-based amorphous alloy powders in Preparation Example 2 (wt. %) | 0 | 10 | 20 | 40 |
| Yield strength (MPa) | 45 | 70 | 85 | 125 |
| Compressive strength (MPa) | 132 | 160 | 187 | 250 |

TABLE 3

|  | Comparative Example 1 | Experimental Example 3-1 | Experimental Example 3-2 | Experimental Example 3-3 |
|---|---|---|---|---|
| Content of Fe-based amorphous alloy powders in Preparation Example 3 (wt. %) | 0 | 10 | 20 | 40 |
| Yield Strength (MPa) | 45 | 72 | 80 | 120 |
| Compressive Strength (MPa) | 132 | 156 | 194 | 244 |

As shown in Tables 1 to 3, the metal matrix composite materials which contain Fe-based amorphous alloy powders have significantly higher yield strength and compressive strength than those of Comparative Example 1 without Fe-based amorphous alloy powders.

Comparative Example 2

According to the content ratio of Experimental Example 2-3 in Table 2, the aluminum alloy powders and the Fe-based amorphous alloy powders $Fe_{49}Cr_{22}Mo_{19}Si_4B_3Y_3$ of Preparation Example 2 were mixed at 300 rpm for 12 hours in a planetary ball mill.

Then, the mixed powders were compacted by a single-shaft hydraulic presser at a pressure of 140 MPa. The compacted block was heated to 400° C. and held in a vacuum sintering furnace for 50 minutes, the sintered block was preheated to 460° C. for 1 hour, and extruded into a bulk at 460° C. The yield strength and compressive strength were measured. The results are shown in Table 4 below.

TABLE 4

|  | Yield strength (MPa) | Compressive strength (MPa) |
|---|---|---|
| Experimental Example 2-3 | 125 | 250 |
| Comparative Example 2 | 40 | 100 |

As shown in Table 4, the bulk obtained by conventional powder metallurgy has significantly lower yield strength and compressive strength than those of the bulk prepared by the method of the present disclosure.

Comparative Example 3

According to the content ratio of Experimental Example 1-3 in Table 1, a three-dimensional structure having the same size as that in Experimental Example 1-3 was prepared in which the Fe-based amorphous alloy powders were changed to aluminum oxide ($Al_2O_3$) powders (particle size: 5 μm to 10 μm; manufactured by Merck). Then, the yield strength, tensile strength, hardness, and compressive strength of the three-dimensional structure were measured. The results are shown in Table 5 below.

Comparative Example 4

According to the content ratio of Experimental Example 1-3 in Table 1, a three-dimensional structure having the same size as that in Experimental Example 1-3 was prepared in which the Fe-based amorphous alloy powders were changed to SiC powders (particle size: 2 μm to 5 μm; manufactured by Merck). Then, the yield strength, tensile strength, hardness, and compressive strength of the three-dimensional structure were measured. The results are shown in Table 5 below.

TABLE 5

|  | Comparative Example | | | Experimental Example | | |
|---|---|---|---|---|---|---|
|  | 1 | 3 | 4 | 1-3 | 2-3 | 3-3 |
| Yield strength (MPa) | 45 | 74 | 86 | 116 | 125 | 120 |
| Tensile strength (MPa) | 140 | 197 | 239 | 289 | 295 | 375 |
| Hardness (Hv) | 115 | 130 | 160 | 220 | 218 | 260 |
| Compressive strength (MPa) | 132 | 163 | 172 | 238 | 250 | 244 |

As shown in Table 5, the metal matrix composite materials which contain Fe-based amorphous alloy powders are superior to the metal matrix composite materials which use ceramic or oxide particles as a filler in terms of yield strength, tensile strength, hardness and compressive strength.

In summary, the present disclosure can solve the problem of poor interface bonding between the metal matrix and the filler in the metal matrix composite material by adding Fe-based amorphous alloy powders containing specific elements, and can produce a metal matrix composite bulk with high yield strength, high compressive strength and complex structure by means of a laser laminate manufacturing method.

It will be apparent to those skilled in the art that various modifications and variations may be made to the structure of the disclosed embodiments without departing from the scope or spirit of the disclosure. In view of the remaining, it is intended that the disclosure cover modifications and variations of this disclosure provided they fall within the scope of the following claims and their equivalents.

What is claimed is:

1. A material for forming metal matrix composite, comprising:
   60-90 wt. % of aluminum alloy powders;
   10-40 wt. % of Fe-based amorphous alloy powders, wherein the Fe-based amorphous alloy powders comprise $Fe_aCr_bMo_cSi_dB_eY_f$, and wherein 48 at. %≤a≤50 at. %, 21 at. %≤b≤23 at. %, 18 at. %≤c≤20 at. %, 3 at. %≤d≤5 at. %, 2 at. %≤e≤4 at. % and 2 at. %≤f≤4 at. %.

2. The material for forming metal matrix composite of claim 1, wherein the aluminum alloy powders have a particle size of 25 μm to 60 μm, and the Fe-based amorphous alloy powders have a particle size of 10 μm to 40 μm.

3. The material for forming metal matrix composite of claim 1, wherein the Fe-based amorphous alloy powders comprise $Fe_{48}Cr_{21}Mo_{18}Si_3B_2Y_2$, $Fe_{49}Cr_{22}Mo_{19}Si_4B_3Y_3$ or $Fe_{50}Cr_{23}Mo_{20}Si_4B_4Y_4$.

4. A metal matrix composite bulk, fabricated by using the material for forming metal matrix composite of claim 1, wherein the metal matrix composite bulk has a yield strength of 70-125 MPa.

5. The metal matrix composite bulk of claim 4, wherein the metal matrix composite bulk has a compressive strength of 160-250 MPa.

6. The metal matrix composite bulk of claim 4, wherein the metal matrix composite bulk is fabricated by a laser additive manufacturing method.

* * * * *